United States Patent [19]

Hakumoto et al.

[11] 4,262,076

[45] Apr. 14, 1981

[54] METHOD FOR MANUFACTURING MAGNETICALLY ATTRACTIVE TONER PARTICLES AND PARTICLE

[75] Inventors: Shigeyuki Hakumoto, Kobe; Koji Nagai; Hiromi Kameda, both of Itami, all of Japan

[73] Assignee: Minolta Camera Kabushiki Kaisha, Japan

[21] Appl. No.: 16,608

[22] Filed: Mar. 1, 1979

[30] Foreign Application Priority Data

Mar. 6, 1978 [JP] Japan ................................ 53-25868

[51] Int. Cl.$^3$ ........................ G03G 9/08; G03G 9/14; B29C 23/00

[52] U.S. Cl. .................................... 430/107; 430/137; 252/62.54; 260/42.56; 264/118; 264/117

[58] Field of Search ...................... 252/62.1 R, 62.1 P, 252/62.1 M, 62.54; 260/42.56; 430/107, 137

[56] References Cited

U.S. PATENT DOCUMENTS

| | | | |
|---|---|---|---|
| 3,639,245 | 2/1972 | Nelson | 252/62.54 |
| 3,909,258 | 9/1975 | Kotz | 430/107 X |
| 3,976,608 | 8/1976 | Buckler et al. | 260/42.56 |
| 4,027,048 | 5/1977 | Crystal | 252/62.1 P |
| 4,133,774 | 1/1979 | Brynko et al. | 252/62.1 P |

FOREIGN PATENT DOCUMENTS

| | | | |
|---|---|---|---|
| 50-90335 | 7/1975 | Japan | 252/62.1 M |

*Primary Examiner*—Roland E. Martin, Jr.
*Attorney, Agent, or Firm*—Wenderoth, Lind & Ponack

[57] ABSTRACT

A method for manufacturing magnetically attractive toner particles utilized for developing electrostatic latent images includes a first step of thermally kneading a mixture of a first resin material and minute particles of magnetizable material, and a second step of thermally kneading, with a second resin material having a higher softening temperature and/or a physically harder nature being further added at the same time, so that a mixture of these three materials, as a whole, is to constitute a composite material having a specific crushing nature. The composite material thus treated is consequently solidified, and then crushed, to form the toner particles, whereby minute particles of magnetizable material comprising each toner particle are respectively to be exposed from an outer boundary of the toner particle.

19 Claims, 3 Drawing Figures

METHOD FOR MANUFACTURING MAGNETICALLY ATTRACTIVE TONER PARTICLES AND PARTICLE

BACKGROUND OF THE INVENTION

This invention relates to a method for manufacturing a magnetically attractive or magnetizable toner material utilized for an electrophotographic dry development process, and more particularly, to a method for manufacturing a toner material wherein minute particles of magnetic or magnetizable material are arranged to be partially exposed from outer boundaries of the respective toner particles as mentioned above.

Recently, in an electrophotograhic process involving dry development, several methods of the dry development employing toner material including therein magnetizable materials in a manner as described above have been proposed.

According to one method, for example, disclosed in Japanese Laid Open Patent Application (Tokkaisho) No. 51-26046(1976), as the toner material to be utilized for the development, a one-component toner material constituted by toner particles including therein magnetizable materials in a manner as described above is prepared for the abovementioned purpose. Furthermore, according to another method, for example, in U.S. patent application Ser. No. 925,699, there is disclosed a magnetic brush development, in which, as the toning agent for developing, a mixture of toner particles including therein magnetizable materials in the manner as described above and non-magnetizable toner particles is prepared for the above-described purpose.

More specifically, according to a previous method, the toner material, as a whole, is first triboelectrically charged through relative rubbing movements of the magnetizable materials exposed from the respective toner particles and the resin material constituting respective toner particles, and thereby, the development is to be accomplished through an electrostatic force properly generated between the toner material triboelectrically charged in the manner described above and an electrostatic latent image formed on a photoreceptor.

In the latter method, minute toner particles including therein magnetizable materials in a manner as described above, respectively, are first mixed with non-magnetizable attractive toner particles having a minute diameter, respectively, so that the toner material thus mixed up is employed for the development process under a condition wherein respective non-magnetizable toner particles are electrostatically attracted or adsorbed or the magnetizable materials exposed in the manner as described earlier. The mixture mentioned above shows a specific behavior when employed in the developing process. More specifically, respective non-magnetizable toner particles are to be slipped from the respective specific positions whereat these have been attracted by the respective magnetizable materials, due to occurrence of mechanical force generated to a certain extent in the course of the development process and exerted on these mixed particles, and thereby, the mixture material, as a whole, exhibits a relatively electrically, conductive nature which can now serve to make it possible to accomplish such development method of the charge induction type as described in U.S. Pat. No. 3,909,258. However, in the course of the transferring process, since non-magnetizable toner is to cover the respective magnetizable material exposed therewith, the mixture, as a whole, has relatively insulating nature, whereby a corona transferring process is effected.

According to the respective development methods as described in the foregoing, the most substantial condition to accomplish these respective methods mentioned above is that, the magnetizable materials included in the respective toner particles of the above-described type are arranged to be positively exposed from the respective outer boundaries of toner particles, since the exposed magnetizable materials should closely contact either the resin portion of toner particles including the magnetizable materials or the non-magnetizable toner particles. Conventionally, since the toner particles including therein exposing magnetizable materials in a manner as described above are manufactured through a process including following sequential steps of mixing magnetizable materials with resin material to such a extent as these being apparently homogeneously mixed up, and subsequent crushing and spray-drying a resultant mixture, the exposing ratio of the magnetizable materials from the respective toner particles, as a whole, depends upon the proportional amount of the magnetizable materials included in the mixture prepared in advance. Specifically, a probability of exposure of the magnetizable material from the respective boundaries of toner particles is confirmed by the relative amount of the magnetizable materials to be mixed with the rest, i.e., the resin material, in advance. Therefore, if the magnetizable materials are to be precisely exposed from the respective outer boundaries of the respective toner particles, a considerable amount of magnetizable materials are first arranged to be included inside respective toner particles themselves.

As far as the resin material utilized for toner particles to be included therein magnetizable materials to be exposed is concerned, the selection of the material mentioned above is limited to those having a relatively high softening temperature, so that the toner material in use for the above-mentioned purpose should not be easily aggregated during the storage or the processing. The resin material having a relatively high softening temperature as mentioned above is, however, apt to show a tendency to poor fixing ability as the relative amount of the magnetizable materials is to be increased. Moreover, according to the magnetic brush development method, the developing agent utilized for the development is a mixture of magnetically attractive toner material and non-magnetizable toner material. Due to a small degree of adhesion between the magnetically attractive toner material and non-magnetizable toner material, as well as the relatively easy scattering of the toner material during use despite the small particle diameter thereof and because the magnetically attractive toner material has few magnetizable materials which are precisely exposed from the respective outer boundaries thereof, there has been such a disadvantage that fogging of the copied image tends to take place.

SUMMARY OF THE INVENTION

Accordingly, an essential object of the present invention is to provide a method for manufacturing magnetically attractive toner particles, wherein minute magnetizable particles constituting respective magnetically attractive particles are effectively to be exposed from an outer boundary of each particle without including any complicated steps.

Another important object of the present invention is to provide a method for manufacturing magnetically attractive toner particles of the above described type, wherein the respective magnetically attractive toner particles are to be so constituted as to inherently have a characteristic nature to prevent mutual aggregation during a developing process without including any complicated steps.

A further object of the present invention is to provide a method for manufacturing magnetically attractive toner particles, wherein the magnetically attractive toner particles respectively having a simple structure and stable functioning can be manufactured in a large quantity at low cost.

In accomplishing these and other objects according to one preferred embodiment of the present invention, there is provided a method for manufacturing magnetically attractive toner particles utilized for developing electrostatic latent images. The method mentioned above comprises the following steps in the order named: thermally kneading a first mixture of a first resin material and minute particles of magnetizable material, to provide a first resultant material; adding a second resin material, having a higher softening temperature and/or a physically harder nature with relation to the first resin material mentioned above, to the first resultant material to prepare a second mixture; thermally kneading the second resultant material; cooling the second resultant material kneaded, to solidification; crushing the solidified material and classifying the resultant particles provided through the crushing step just mentioned above.

More specifically, as for the first resin material, at least one of the thermoplastic resins including therein hydrogenated rosin, fatty acid amide, styrene resin, polyvinyl chloride resin, polyvinyl acetate resin, polyethylene resin, polypropylene resin, acrylic resin, and polyvinyl alcohol resin together with thermosetting resins including epoxy resin, and polyester resin is appropriately chosen. As for the second resin material, at least one of thermoplastic resins including styrene resins such as polystyrene resin, styrene-acrylic ester copolymer and acrylonitrile-styrene copolymer, saturated aliphatic hydrocarbon, and acrylic resin together with thermosetting resins including epoxy resin and polyester resin is also appropriately chosen.

A resultant magnetically attractive toner particle thus obtained through the method according to the present invention is provided with a specific composite structure, wherein the minute particles of the magnetizable material at least partially laminated by the first resin material, respectively, while respective portions of the minute particles laminated by the first resin material are further integrated by the second resin material.

Therefore, the magnetically attractive toner particles of the present invention are respectively characterized in the following two points as described hereinbelow.

The one characteristic point is that minute particles of magnetizable particles constituting respective magnetically attractive particles are effectively exposed from respective outer boundaries of respective particles. The other characteristic point is that the magnetically attractive toner particles of the present invention are inherently provided with a characteristic nature to prevent mutual aggregation even under a relatively high temperature condition to be established during the developing process, due to the fact the resin material having a relatively low softening temperature included in the resultant particle is effectively integrated or, more specifically, enclosed by the resin material having a relatively high softening temperature as may be clear from the resultant particle structure as described above.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted that like parts are designated by like reference numeral numbers throughout several views of the accompanying drawings.

DETAILED DESCRIPTION OF THE INVENTION

Figure 1:
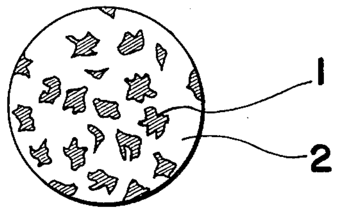
FIG. 1 is cross-sectional view of a portion of a resultant composite material, on an enlarged scale, prepared through a step of thermally kneading a mixture of a resin material having a relatively low softening temperture and particles of magnetizable material according to the present invention, in which a number of minute particles of magnetizable material are well dispersed in the resin material of the above described type.

According to the present invention, respective magnetically attractive toner particles are to be composed of minute particles of one of magnetizable materials, resin material having a relatively low softening temperature and/or a brittle nature, and another resin material having a relatively high softening temperature when compared with that of the above-mentioned resin material, wherein as far as a resultant single magnetically attractive toner particle is concerned, minute particles of the magnetizable material at least partially laminated by the above-mentioned resin material having a relatively low softening temperature, respectively, while respective portions of the minute particles laminated by the above-mentioned resin material are further integrated by the above-mentioned resin material having a relatively high softening temperature.

As for the magnetizable powder material to be employed for composing the magnetically attractive particles according to the present invention, one of the known materials having a ferromagnetic nature such as iron, cobalt, nickel, chrome, manganese, and their respective chemical compounds or alloys, for instance, such as tri iron tetra oxide, γ-di-iron trioxide, chromium dioxide, manganese oxide, ferrite, or manganese-copper system alloy, can be employed.

As far as the resin material having a relatively low softening temperature or a brittle nature as mentioned earlier is concerned, one of such materials having a softening temperature of 50° to 100° C., preferably of 50° to 85° C., or alternatively, one of the materials having a physically brittle nature when compared with the resin materials as will be mentioned hereinbelow can be employed. More specifically, as for the resin material just described above, one of the thermoplastic resin such as hydrogenated rosin, fatty acid amide, styrene resin, polyvinyl chloride resin, polyvinyl acetate resin, polyethylene resin, polypropylene resin, acrylic resin, polyvinyl alcohol resin etc., and, of the thermosetting resins such as epoxy resin, polyester resin etc. are respectively employed, and more particularly, one of commercial products, for example, Epikoto-1001 or -1002 produced by Shell Chemical Co., Estergum-H produced by Arakawa Chemical Industries Limited, Piccolastic A-75 or A-50 produced by Esso Kagaku Kabushiki Kaisha, Amide-S produced by Nitto Chemical Industry Co., Ltd. may be available for the above-mentioned resin material.

As far as the resin material having a relatively high softening temperature as described earlier is concerned, the resin material to be desirably employed should be prepared so as to satisfy the following two specific properties relatively defined in respect to the resin material having a relatively low softening temperature described above.

One of the characteristics of the material, as mentioned above, is that the specific softening temperature of the resin material must be higher than that of the resin material having a relatively low softening temperature by at least, approximately ten degrees, or more specifically, must have a softening temperature of 80° to 180° C. or preferably a temperature range of 90° to 140° C. Furthermore, as for the second characteristic of the material as mentioned above, it must exhibit a high resistance to mechanical shock when compared with that of the resin material having a relatively low softening temperature mentioned above. More specifically, as for the resin material just described above, one of the thermoplastic resins such as styrene resin including polystyrene resin, styrene-acrylic ester copolymer and acrylonitrile-styrene copolymer, saturated aliphatic hydrocarbon, acrylic resin etc., and, of the thermosetting resins such as epoxy resin, polyester resin etc., can be employed, and more particularly, one of the commercially available products, for example, Epikoto-1004 produced by Shell Chemical Co., Piccolastic D-125 produced by Esso Kagaku Kabushiki Kaisha, Pliolite-AC or -ACL produced by The Goodyear Tire & Rubber Co., Arkon P-100 produced by Arakawa Chemical Industries Limited, Hymer SBM 73 or Hymer UP 110 produced by Sanyo Chemical Industries, Ltd. may be available for the above-mentioned resin material.

Furthermore, for the resin material having a low softening temperature, the resin material capable of being easily polymerizable through heating process, such as monomeric styrene may be alternatively employed.

In addition to the above-mentioned substantial components for composing the magnetically attractive toner material, if the magnetically attractive toner material is to be colored in a predetermined color, one of the conventional colorants including carbon black, inorganic pigment, organic pigment etc., may be further added to the process-mixture of the above-mentioned substantial components.

In the following, taking advantage of the respective materials described in the foregoing, a method for manufacturing magnetically attractive toner particles or magnetizable toner particles to be employed for an electrophotographic dry development process wherein minute particles of magnetizable material composing respective toner particles are arranged to be exposed from respective outer boundaries of the respective abovementioned particles, according to the present invention, is to be specifically described.

Figure 2:
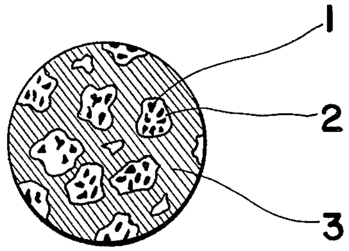
FIG. 2 is a cross-sectional view of a portion of a resultant composite material, on a less enlarged scale with respect to FIG. 1, prepared through a step of further addition of a resin material having a relatively high softening temperature to the result as described in FIG. 1 and, a successive step of thermally kneading the resultant mixture as mentioned above, in which a number of masses of the composite material as described in FIG. 1 are resultantly dispersed in the resin material having a relatively high softening temperature.
Figure 3:
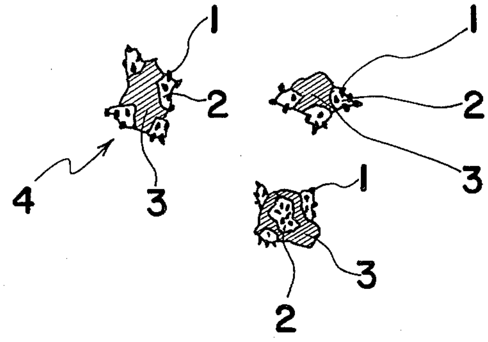
FIG. 3 is a cross-sectional view of a number of magnetically attractive toner particles according to the present invention, on an enlarged scale, prepared through the step of cooling and successively crushing the composite material as shown in FIG. 2 and, a subsequent step of classifying the resultant composite particles treated in a manner as described in the foregoing, in which each magnetically attractive toner particle includes therein the minute particles of magnetizable material in respective exposed states from the outer boundary of the particle.

Referring now to FIGS. 1 to 3, there is shown a series of changes in feature of the respective composite states of the above-mentioned material in accordance with a treatment according to the present invention.

As for the first step of the manufacturing method according to the present invention, an apparent mixture prepared from the minute magnetizable particles or minute particles 1 of magnetizable nature and at least one of the resin materials 2 having a relatively low softening temperature and/or a brittle nature mentioned earlier is kneaded with the help of a roller means of heating treatment type (not shown). The resultant feature of the composite mass treated in a manner as mentioned above is specifically shown in FIG. 1. As is seen from FIG. 1, a number of the minute particles of magnetizable material are well dispersed in the resin material of the abovedescribed type, in which the respective minute particles of magnetizable material 1 are enclosed by the resin material 2 mentioned above, due to the effects caused by an appropriate temperature control in the course of the kneading process concerned.

To the composite mass thus kneaded in the step described above is further, sometimes forcibly, added at least one of the resin materials having a relatively high softening temperature 3, and the resultant mixture is successively kneaded, so that the second stage composite mass according to the present invention is to be prepared. However, the step for kneading mentioned above is performed in a temperature range which lies above the softening temperature of the resin material 3 having a relatively high softening temperature employed here. As is clear from FIG. 2, the resultant composite mass produced in the second step described above shows a specific feature, in which a number of the composite masses composited in the first step are respectively, well dispersed in the resin material 3 having a high softening temperature employed. However, in spite of the fact that the composite masses of the first step are respectively enclosed by the resin material 3 having a high softening temperature, the respective minute particles 1 of magnetizable materials are still maintained in an enclosed or a laminated state by the resin material 2 having a relatively low softening temperature mentioned above.

After having been solidified through one of the conventional cooling means, the resultant mass of the second stage is ground or crushed by means of one of the conventional crushing means, and is subsequently classified. FIG. 3 shows a number of masses and their respective features, which are resultantly brought about through the step of crushing as mentioned above, wherein a large number of the magnetizable particles 1 composed are resultantly exposed from the resin material 2 having a relatively low softening temperature, while some number of masses of the second step, or more particularly, masses respectively composed of the resin material 2 having a relatively low softening temperature and magnetizable particles 1, are integrated by the resin material 3 having a relatively high softening temperature.

According to a process of the present invention, since the resin material 2 having a low softening temperature characterized by its brittle nature tends to be gathered and solidified in the immediate neighborhood of the respective particles 1 of magnetizable material, the final resultant mass is therefore apt to be split into a number of small particles 4 with respect to a certain boundary portion defined by the resin material 2 having a low softening temperature and existing around the respective particles of magnetizable material, when the resultant mass mentioned above is to be crushed in the third step described in the foregoing. Due to the crushing characteristics as described above, the particles 1 of magnetizable material are to have a tendency to be exposed from the outer boundary of the resultant toner particle 4, therefore, rendering a high probability of exposing of the particles of magnetizable material, when compared with those included in respective toner particles manufactured by conventional methods.

Consequently, depending upon the fact that the particles 1 of the magnetizable material in the respective toner particles are in turn to be given a high probability to be partially exposed from the respective outer boundaries mentioned above, and on the fact of the inclusion of the resin material having a low softening temperature as one of the toner components, the toner particles 4 manufactured according to the present invention show relatively good developing characteristics without reducing fixing characteristics when compared with the conventional toner particles.

In connection with the description concerning the splitting characteristics described above, the further considerations needed to understand the crushing characteristics mentioned above are first presented hereinbelow. One of the reasons to cause such a specific crushing as described above is a shock caused by the crushing, through which the portion or boundary mentioned above constituted by the resin material 2 having a relatively low softening temperature is naturally, especially susceptible to being split. Another reason to cause such a specific crushing as described above is attributable to the thermal effect brought about by a crushing operation, which inherently is accompanied by generation of heat. More specifically, the heat generated in the course of crushing step, makes the strength of material 2, having a relatively low softening temperature or characterized by its brittle nature, become thermally degraded and therefore, the portion or boundary mentioned above is resultantly separated from the outer boundaries of the respective particles 1 of magnetic material in a manner as described in the foregoing.

As may be clear from the description in the foregoing, even with the manufacturing method of the present invention, a certain number of particles 1 of magnetizable material constituting respective toner particles 4 may be left to be exposed, however, while being somewhat laminated by respective, residual thin films of the resin material 2 having a relatively low softening temperature mentioned above. However, even under these states of some toner particles of the present invention, respective toner particles 1 having particles of magnetizable material laminated by the thin film mentioned above can show the same characteristics as those brought about by the mixture of toner particles 4 with the respective magnetizable particles being not laminated by the thin films mentioned above at all, due to the fact that these films are not so thick as to prevent occurrence of triboelectrical phenomenon when employed in the developing process.

Accordingly, according to the employment of magnetic brush development as the developing method, in which magnets are arranged to be rotated inside the electrically conductive sleeve, mere employment of the resin material having a low softening temperature without any further technical arrangements is not desirable, since the toner particles of the above described type may be easily aggregated and then, solidified on the sleeve mentioned above through the thermal effect caused by an eddy current, which is generated in and around the sleeve during its operation, together with the rather higher surrounding temperature inside a device employed in the developing method mentioned above. In consideration of improvement of the above mentioned defect, as often described above, according to the toner particles 4 of the present invention, the respective particles 1 of magnetizable material mentioned above are at least partially enclosed by the resin material having a low softening temperature, while the respective masses enclosing therein the respective non-exposed portion of the particles of magnetizable material of the resin material 2 having a relatively low softening temperature, are in turn integrated with each other by the resin material 3 having a relatively high softening temperature, to resultantly form respective toner particles 4. Furthermore, due to the characteristic composite arrangement of the present particles 4, or the specific feature concerning respective partial exposures of the respective particles 1 of magnetizable material as described in the foregoing, the toner particles 4 of the present invention show an improvement in transportability, when employed not only in the development with one-component toner, but also in the above mentioned magnetic brush development. Moreover, employment of the toner material of the present invention in the above mentioned magnetic brush development further contributes to make the electrostatically attractive force between the present toner material and non-magnetizable toner material become very powerful, whereby the resultant copied image is not accompanied by any electrostatic image contamination or fogging. In addition to the above-described specific characteristics, since a coadhesive force between the magnetically attractive toner particle and non-magnetizable toner particle is to be enhanced and thereby, the consumption ratio of the respective toner materials for the developing purpose is not to be so heavily changed, the mixture ratio of two toner materials of the mixed toner may be reasonably well fixed in advance, irrespective of the nature of images to be developed.

Although the mixture ratio of the resin material having a relatively high softening temperature and the resin material having a relatively low softening temperature can, naturally, be adequately prepared in advance, depending upon the specific physical or chemical nature of the respective resin materials to be employed as well as the condition for utilizing the mixture for the developing purpose, the quantity of the resin material having a relatively low softening temperature relative to the whole mixture is generally 10 to 90% by weight, and more specifically, the most preferable ratio mentioned above ranges between 20 to 70% by weight.

In the following, several embodiments of methods for manufacturing the electrically attractive toner particles according to the present invention are detailed in succession, especially taking into account providing different kinds of effective toner particles respectively composed of different combinations of the three basic materials described earlier. It should be noted that, in the following EXAMPLES, the mixing ratio of respective components is relatively expressed by parts by weight of the final composite material or mixture of the above-described three basic materials.

EXAMPLE 1

A mixture composed of 30 parts by weight of Estergum-H (hydrogenated rosin produced by Arakawa Chemical Industries Limited, and having a softening temperature of 70° C.), and 100 parts by weight of Magnetite RB-BL (magnetite produced by Titan Kogyo Kabushiki Kaisha, and having an average particle diameter of 0.6 μm) was kneaded for about 30 minutes at a temperature of 120° C. with a heating rollers (not shown). To the resultant mixture treated as described above was added 80 parts by weight of Hymer SBM 73 (styreneacrylic ester produced by Sanyo Chemical Industries, Ltd., and having a softening temperature of 94° C.), and this was kneaded for about 30 minutes at the same temperature of 120° C. Subsequently, the final mixture or composite material thus treated was cooled down to room temperature and crushed by a jet-mill, into minute particles having an average particle diameter of 14 μm, with the respective particles of magnetizable material being partially exposed from respective outer boundaries of the respective particles.

EXAMPLE 2

A mixture composed of 100 parts by weight of ferrite ((Mn.Zn)O.$Fe_2O_3$) having an average particle diameter of 0.6 μm, 20 parts by weight of Amide-C (fatty acid amide produced by Kao Soap Co., Ltd., and having a softening temperature ranged from 80° to 90° C.) and 10 parts by weight of pliolite AC (Styrene-acrylic ester produced by The Goodyear Tire & Rubber Co., and having a softening temperature of 160° C.) was kneaded for about 30 minutes at a temperature of 165° C. with the heating rollers. In the resultant mixture treated as described above was added 30 parts by weight of Pliolite AC, and successively, this was kneaded for about 30 minutes at a temperature of 165° C. Subsequently, after the accomplishment of the final step as described in EXAMPLE 1, minute particles having an average particle diameter of 16 μm with the respective particles of magnetizable material being partially exposed from respective outer boundaries of the respective particles were obtained.

EXAMPLE 3

A mixture composed of 100 parts by weight of tri iron tetra oxide having an average particle diameter of 2 to 6 μm, 10 parts by weight of Piccolastic A-75 (styrene resin produced by Esso Kagaku Kabushiki Kaisha, and having a softening temperature of 75° C.) and 10 parts by weight of Piccolastic D-125 (styrene resin produced by Esso Kagaku Kabushiki Kaisha, and having a softening temperature of 75° C.) was kneaded for about 10 minutes at a temperature of 170° C. with heating rollers. To the resultant mixture treated as described above was added 30 parts by weight of Piccolastic D-125, and successively, this was kneaded for 10 minutes at a temperature of 170° C. Subsequently, after the accomplishment of the final step as described in EXAMPLE 1, minute particles having an average particle diameter of 22 μm with the respective particles of magnetizable material being partially exposed from respective outer boundaries of the respective particles were obtained.

EXAMPLE 4

A mixture composed of 100 parts by weight of iron powder having an average particle diameter of 5 μm and 30 parts by weight of Epikoto 1001 (epoxy resin produced by Shell Chemical Co., and having a softening temperature of about 70° C.) was first kneaded for about 15 minutes at a temperature of 120° C. with the heating rollers. The resultant mixture treated as described above was kneaded for 10 minutes at the same temperature of 120° C. with Arkon P-100 (saturated aliphatic hydrocarbon produced by Arakawa Chemical Industries Limited and having a softening temperature of 100° C.) being gradually added. Subsequently, after the accomplishment of the final crushing step as described in EXAMPLE 1, minute particles having an average particle diameter of 9 μm with the respective particles of magnetizable material being partially exposed from respective outer boundaries of the respective particles were similarly obtained.

EXAMPLE 5

A mixture composed of 100 parts by weight of tri iron tetra oxide and 30 parts by weight of Estergum-H was kneaded for 30 minutes at a temperature of 120° C. with the heating rollers. To the resultant mixture treated as described above was added 80 parts by weight of Hymer SBM-73 and successively, this was kneaded for 5 minutes at a temperature of 120° C. Subsequently, after the accomplishment of the final crushing step as described in EXAMPLE 1, minute particles having an average particle diameter of 14 μm with the respective particles of magnetizable material being partially exposed from respective outer boundaries of the respective particles were similarly obtained.

EXAMPLE 6

A mixture composed of 100 parts by weight of tri iron tetra oxide having an average particle diameter of 0.6 μm and 45 parts by weight of Piccolastic A-50 having a softening temperature of 50° C. was first ground with a ball mill and, thereafter, kneaded for 15 minutes at a temperature of 150° C. To the resultant composite material treated as described above was added 30 parts by weight of Pliolite ACL crushed beforehand and having a softening temperature of 135° C., and successively, this was kneaded for 10 minutes. Subsequently, the final mixture or composite material treated as described above was cooled and then, crushed and thereafter, classified so as to provide minute particles having an average particle diameter of 17 μm with the respective particles of magnetizable material being partially exposed from respective outer boundaries of the respective particles.

EXAMPLE 7

Taking advantage of the same basic materials employed in Example 1, one of the embodiments for preparing another kind of toner particle, with the respective particles of magnetizable material being partially exposed from respective outer boundaries of the respective toner particles, is detailed hereinbelow.

More specifically, after 30 parts by weight of Ester-gum-H having been dissolved in 500 ml toluene 100 parts by weight of tri iron tetra oxide was further added to the mixture mentioned above, and mixed to such an extent that the respective particles of magnetizable material are in a well dispersed state in the mixture mentioned above. Sequentially, the heterogeneous material mentioned above is treated with a spray dryer means, to provide particles of magnetizable material respectively laminated by the resin material and having an average particle diameter of 2 μm. The resultant particulate material was then, further mixed with 80 parts by weight of Hymer SBM 73, and then kneaded for 15 minutes at a temperature of 120° C. with the heating rollers, before the successive performance of the final crushing step described in the foregoing. The resultant magnetically attractive toner particles have an average particle diameter of 13 μm, respectively, with the respective particles of magnetizable material being partically exposed from respective outer boundaries of the respective toner particles.

COMPARATIVE EXAMPLE

Taking advantage of the respective combinations of the basic three materials as described in the respective foregoing EXAMPLES 1 to 6, the respective combinations were treated in a somewhat different manner in comparison with the respective treatments employed in the respective foregoing EXAMPLES.

More specifically, after having been first simultaneously melted and kneaded, each combination produced toner particles having the same average particle diameter as those correspondingly obtained in the respective foregoing EXAMPLES, by a series of steps including cooling the resultant material kneaded in a manner as described above: crushing coarsely and then, finely the resultant material cooled, and, subsequently, classifying the minute powder particles crushed in a manner as described above.

To observe as well as to check the degree of exposure of the respective magnetizable materials of particles respectively prepared in a manner as described above, each kind of particles, or the sample material, was mixed with a carrier agent of iron powder having an average particle diameter of 100 μm for 30 minutes with a mixing device of V-shaped type (not shown), and thereby, the triboelectrical charge amount per specific amount of the sample material thus treated as mentioned above was measured through a blow-off method respectively.

The experimental results for the materials of the foregoing Examples and the corresponding comparative materials are shown in Table 1.

TABLE 1

| Sample Material No. | Amount of Charge | Comparative Sample Material No. | Amount of Charge |
|---|---|---|---|
| 1 | −0.1 μc/gr | 1 | +0.4 μc/gr |
| 2 | +0.05 μc/gr | 2 | +4 μc/gr |
| 3 | −0.4 μc/gr | 3 | +2 μc/gr |
| 4 | 0.00 μc/gr | 4 | +0.8 μc/gr |
| 5 | −0.10 μc/gr | 5 | +0.4 μc/gr |
| 6 | −0.05 μc/gr | 6 | +0.2 μc/gr |
| 7 | −0.1 μc/gr | | |

Since the magnetic material or magnetizable material employed for the respective sample materials and comparative sample materials are mainly constituted by iron, the degree of triboelectrical charge of these sample materials through the mixing process with the carrier of iron is to be lowered in proportion to the degree of exposure of the respective particles of magnetizable material from the respective outer boundaries of the toner particles. Therefore, it should be noted that, the smaller the absolute figure of triboelectrical charge, the larger the extent of exposure the particles of magnetizable material from the boundary of the toner particle constituting the sample or comparative sample material described above. Accordingly, as may be clear from Table 1, each exposure ratio of the particle of magnetizable material included in respective toner particles of magnetizable particles exposing type according to the present invention is relatively much higher than that of conventional toner particles including therein magnetizable particles which may approximately correspond to the respective comparative sample materials listed in Table 1.

In order to confirm the effectiveness of the toner particles of the present invention, a series of electrophotographic copying experiments, including a step of the magnetic brush development therein, were carried out by employing several mixtures of magnetic toner described in the foregoing and non-magnetizable toner as described hereinbelow as for the toner agents. Here, with respect to the non-magnetic toner, a mixture of materials listed hereinbelow were first kneaded for 10 minutes under a temperature of 110° C. with the heating rollers, and further continuously kneaded for another 5 minutes at a temperature of 130° C. The resultant composite material thus kneaded in a manner as described above was successively crushed and thereafter, classified, to provide non-magnetic particles having an average particle diameter of either 4 μm or 15 μm.

Composition of non-matnetizable toner materials

| | |
|---|---|
| Piccolastic D-125 | 100 parts by weight |
| carbon black | 10 parts by weight |
| Oilblack[(1)] | 1 part by weight |

[(1)]a colorant produced by Orient Chemical Industries, Ltd.

(EXPERIMENTAL RUN 1)

magnetically attractive toner material obtained in EXAMPLE 1—100 parts by weight non-magnetizable toner material having an average particle diameter 15 μm—20 parts by weight In the toner image transferring copier employing the magnetic brush development for the developing method, the employment of the toner mixture composed by the toners listed above permitted an electrostatic latent image to be quite effectively developed, and therefore, resultant images transferred onto substrates were quite clear without causing any fogging or more particularly, without causing any obscure outline of images transferred. And also it permitted resultant image transferred onto substrates without reducing developing characteristics.

More specifically, as far as the other experimental conditions and devices employed in the above described EXPERIMENTAL RUN 1 are concerned, the device employed for the magnetic brush employment was a fixed sleeve type having magnet member of rotating type therein, and the revolutions of the magnet member were 1,200 rpm. The shifting speed of a photoreceptor or, more particularly, a layer to be electrostatically developed was set at 8.7 cm/sec. The maximum electrical surface potential of the photoreceptor was −750 V in the course of the experiment. The toner particle image on the photoreceptor was successively electrostatically transferred onto a plain paper, and subsequently, thermally fixed through a fixing device of the heat-roller type. Furthermore, for an original to be copied, a chart constituted by line images as well as a chart constituted by areal images were both prepared to observe relative difference in consumption of magnetic toner when these are to be copied, wherein the consumption ratio of magnetically attractive toner particles to the whole consumption of toner of 100 mg, for each, was confirmed to be 30 mg for the chart of the former type and to be 20 mg for the chart of the latter type through appropriate measurements. A permissible mixture ratio of toner materials of this experiment for obtaining the clear images on the substrates was found to lie in a range of a ratio of 100 to 3, to a ratio of 100 to 110 with respect to a term of ratio of magnetically attractive toner to non-magnetizable toner.

(COMPARATIVE EXPERIMENTAL RUN 1)

In this experiment run, the experiments were carried out under the same experimental conditions and with devices as those employed in EXPERIMENTAL RUN 1, except that the comparative magnetically attractive toner material labelled by No. 1 of the comparative sample material in Table 1 was employed for this run instead of the magnetizable toner material employed in EXAMPLE 1.

The experimental results obtained are listed hereinbelow.

(1) Image-condition transferred onto substrates—Including not so much fogging around image transferred (2) Specific consumption amount of the magnetically attractive toner material for copying the chart constituted by line images—40 mg/100 mg (3) Specific consumption amount of the magnetically attractive toner material for copying the chart constituted by areal images—20 mg/100 mg (4) Permissible ratio of the magnetically attractive-to non-magnetizable toner material (the upper limit)—10:8

(EXPERIMENTAL RUN 2)

magnetically attractive toner material obtained in Example 3—100 parts by weight non-magnetizable toner material having an average particle diameter of 15 μm—10 parts by weight In this experimental run, the experiments were carried out under the same experimental conditions and with devices as those employed in EXPERIMENTAL RUN 1 except for the employment of a mixture prepared by the materials listed above as a developing agent for this run.

The experimental results are listed hereinbelow.

(1) Image-condition transferred onto substrates—Including no fogging with clear and definite image transferred (2) Specific consumption amount of the magnetically attractive toner material for copying the chart constituted by line images—30 mg/100 mg (3) Specific consumption amount of the magnetically attractive toner material for copying the chart constituted by areal images—20 mg/100 mg (4) Permissible ratio of the magnetically attractive-to non-magnetizable toner material (the upper limit)—10:10

(COMPARATIVE EXPERIMENTAL RUN 2)

In this experimental run, the experiments were carried out under the same experimental conditions and with devices as those employed in EXPERIMENTAL RUN 2 except that the comparative magnetically attractive toner material labelled No. 3 of the comparative sample material in Table 1 were employed for this run instead of the magnetically attractive toner material employed in EXAMPLE 2. The experimental results obtained are listed hereinbelow.

(1) Image-condition transferred onto substrates—Including slight fogging around image transferred (2) Specific consumption amount of the magnetically attractive toner material for copying the chart constituted by line images—40 mg/100 mg (3) Specific consumption amount of the magnetically attractive toner material for copying the chart constituted by areal images—20 mg/100 mg (4) Permissible ratio of the magnetically attractive-to non-magnetizable toner material (the upper limit)—10:8

(EXPERIMENTAL RUN 3)

magnetically attractive toner material obtained in EXAMPLE 3—100 parts by weight non-magnetizable toner material having an average particle diameter of 4 μm—10 parts by weight In this experimental run, the experiments were carried out under the same experimental conditions and with devices are those employed in EXPERIMENTAL RUN 1 except for the employment of a mixture prepared by the materials listed above as a developing agent for this run.

The experimental results are listed hereinbelow.

(1) Image-condition transferred onto substrates—Including no fogging with clear and definite image transferred (2) Specific consumption amount of the magnetically attractive toner material for copying the chart constituted by line images—25 mg/100 mg (3) Specific consumption amount of the magnetically attractive toner material for copying the chart constituted by areal images—20 mg/100 mg (4) Permissible ratio of the magnetically attractive-to non-magnetizable toner material (the upper limit)—10:7

(COMPARATIVE EXPERIMENTAL RUN 3)

In this experimental run, the experiments were carried out under the same experimental conditions and with devices as those employed in EXPERIMENTAL RUN 3 except that the comparative magnetically attractive toner material labelled by No. 3 of the comparative sample material in Table 1 was employed for this run instead of the magnetically attractive toner material employed in EXAMPLE 3.

The experimental results obtained are listed hereinbelow.

(1) Image-condition transferred onto substrates—Including fogging with indefinite image transferred (2) Specific consumption amount of the magnetically attractive toner material for copying the chart constituted by line images—35 mg/100 mg (3) Specific consumption amount of the magnetically attractive toner material for copying the chart constituted by areal images—20 mg/100 mg (4) Permissible ratio of the magnetically attractive-to non-magnetizable toner material (the upper limit)—10:5

(EXPERIMENTAL RUN 4)

magnetically attractive toner material obtained in EXAMPLE 5—100 parts by weight non-magnetizable toner material having an average particle diameter of 15 μm—30 parts by weight In this experimental run, the experiments were carried out under the same experimental conditions and with devices as those employed in EXPERIMENTAL RUN 1 except for the employment of a mixture prepared by the materials listed above as a developing agent for this run.

The experimental results are listed hereinbelow.

(1) Image-condition transferred onto substrates—Including no fogging with clear and definite image transferred (2) Specific consumption amount of the magnetically attractive toner material for copying the chart constituted by line images—25 mg/100 mg (3) Specific consumption amount of the magnetically attractive toner material for copying the chart constituted by areal images—20 mg/100 mg (4) Permissible ratio of the magnetically attractive-to non-magnetizable toner material (the upper limit)—10:12.5

(EXPERIMENTAL RUN 5)

magnetically attractive toner material obtained in EXAMPLE 6—100 parts by weight non magnetizable toner material having an average particle diameter of 15 μm—80 parts by weight In this experimental run, the experiments were carried out under the same experimental conditions and with devices as those employed in EXPERIMENTAL RUN 1 except for the employment of a mixture prepared by the materials listed above as a developing agent for this run.

The experimental results are listed hereinbelow.

(1) Image-condition transferred onto substrates—Including no fogging with clear and definite image transferred (2) Specific consumption amount of the magnetically attractive toner material for copying the chart constituted by line images—25 mg/100 mg (3) Specific consumption amount of the magnetically attractive toner material for copying the chart constituted by areal images—20 mg/100 mg (4) Permissible ratio of the magnetically attractive-to non-magnetizable toner material (the upper limit)—10:13

(COMPARATIVE EXPERIMENTAL RUN 5)

In this experimental run, the experiments were carried out under the same experimental conditions and with devices as those employed in EXPERIMENTAL RUN 5 except that the comparative magnetically attractive toner material labelled by No. 6 of the comparative sample material in Table 1 was employed for this run instead of the magnetically attractive toner material employed in EXPERIMENTAL RUN 5. The experimental results obtained are listed hereinbelow.

(1) Image-condition transferred onto substrates—

Including slight fogging around images transferred (2) Specific consumption amount of the magnetically attractive toner material for copying the chart constituted by line images—35 mg/100 mg (3) Specific consumption amount of the magnetically attractive toner material for copying the chart constituting by areal images—20 mg/100 mg (4) Permissible ratio of the magnetically attractive-to non-magnetizable toner material (the upper limit)—10:9

(EXPERIMENTAL RUN 7)

In this experimental run, the experiments were carried out under the same experimental conditions and with devices as those employed in EXPERIMENTAL RUN 1, except that the magnetically attractive toner material obtained in EXAMPLE 7 were employed for this run instead of the magnetically attractive toner material employed in EXPERIMENTAL RUN 1. The experimental results obtained in this run showed nearly the same results obtained in EXPERIMENTAL RUN 1.

As is clear from the experimental results as described in the foregoing, the magnetically attractive toner particle including therein the minute particles of magnetizable materials in respective exposed states from the outer boundary of the particle according to the present invention, contributes to obtaining precise images on the substrates, without causing any fogging or smearing defects, irrespective of the kinds of the originals to be copied, when employed in the toner image transferring copier especially including the magnetic brush development wherein the mixture prepared by the magnetically attractive toner and non-magnetizable toner is inevitably employed for the toner agent. Furthermore, the magnetically attractive toner materials of the present invention are characterized in that, not only variation in the consumption of the magnetizable toner particles is small, irrespective employment of different originals, but also the allowance in the mixing ratio of the magnetically attractive toner to the non-magnetizable toner is fairly large.

In the following, results of a series of experiments with the magnetically attractive toner materials of the present invention being solely employed as the developing agent, are to be described.

(EXPERIMENTAL RUN 8)

With the help of the magnetic brush development employing the toner material obtained in EXAMPLE 1, an experiments was carried out under the same conditions and with the devices as those employed in EXAMPLE 1. More specifically, the toner material mentioned above was, however, first mixed for 10 minutes with the mixing device of V-shaped type so that the respective toner particles were triboelectrically charged in advance and thereafter, packed into the developing device of the above-described type.

The experimental results of this run showed high-fidelity developments, and provided the excellent copying results without including any fogging or smearing thereon. Furthermore, although the rotational speed of the magnet member was increased as far as 2,000 rpm in order to promote the transportability of respective toner particles existing on the sleeve portion of the developing device, the aggregation of toner particles did not occur at all according to the present invention.

(COMPARATIVE EXPERIMENTAL RUN 8)

In this experimental run, the experiments were carried out under quite the same experimental conditions and with the devices as those employed in EXPERIMENTAL RUN 8, except that the toner material employed for this run was one labelled by No. 1 of the comparative sample materials in Table 1. The experimental results of this run showed high-fidelity developments, while the resultant image transferred had a slight fogging, respectively. Furthermore, the toner particles mentioned above were slightly aggregated, when the rotational speed of the magnet member reached a speed of 2,000 rpm. As far as fixing ability is concerned, it is quite natural that, there is no difference at all in effectiveness between the toner material obtained in EXAMPLE 1 and one labelled by No. 1 of the comparative sample materials in Table 1, since the basic constitutents of both toner sample materials are not substantially different from each other. However, a difference in the aggregating property of the two as described in the foregoing can be attributable to the difference in the physical constitution in preparing the toner particles of the present invention and the toner particles of the conventional type. The difference in the aggregation property of the two mentioned above can be explained by a phenomenon described hereinbelow.

According to the method for manufacturing magnetically attractive toner particle including therein minute particles of magnetizable material in respective exposed states from the outer boundary of the particle of the present invention, since the resin material having a relatively low softening temperature is to be dispersed as a few masses thereof within the resin material having a relatively high softening temperature, with the respective masses enclosing a few minute particles of magnetizable material and furthermore, several masses mentioned above, as a whole, are further partially enclosed by the resin material having a relatively high softening temperature in a dispersed state, the relative quantity of the resin material having a relative low softening temperature to be resultantly exposed in response to crushing is to be extremely small due to the phenomenon described above, even if the final composite material as described above, as a whole, is forcibly crushed through the mechanical crushing operation, to form a number of the magnetically attractive toner particles.

On the other hand in the ordinary toner particle material, since both resin materials, one of which is to have a relatively higher softening temperature than that of the other, are homogeneously mixed to form the resultant toner particle material, the respective particles apparently show a characteristic property which inherently belongs to the resin material having a relatively low softening temperature, as far as the thermal property of the resultant particle is concerned, and thereby, the softening temperature of the toner particle itself is apparently equivalent to that of the resin material having a relatively low softening temperature, whereby the ordinary toner particles stored in and around the sleeve portion employed in the magnetic brush development are thus apt to be relatively thermally effected.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. Magnetically attractive toner particles which comprise minute particles of at least one magnetizable material dispersed in and laminated to a first resin to form a first resultant material, with masses of said first resultant material being dispersed in a matrix of a second resin, said masses of first resultant material at least partially defining the borders of said toner particles and said minute particles of magnetizable material being partially exposed from said masses of said first resultant material and said first resin being more readily split upon physical impact than said second resin.

2. A method of manufacturing magnetically attractive toner particles suitable for developing electrostatic latent images which comprises the steps of:

(a) kneading a mixture of a first resin and minute particles of a magnetizable material to form a first resultant material;

(b) kneading said first resultant material with a second resin material which is less easily crushed under the conditions of step (c) than said first resin to form a second resultant material, which is a matrix of said second resin material having masses of first resultant material dispersed therein and (c) crushing said second resultant material by physical impact, whereby said second resultant material is substantially split along borders defined by said masses of said first resultant material to form said magnetically attractive toner particles, with said masses of said first resultant material being partially exposed on and defining the surface of said toner particles, with said magnetically attractive particles being partially exposed on the surface of said masses of said first resultant material.

3. The method according to claim 2 wherein said kneading of step (b) is performed at a temperature above the softening point of said second resin.

4. The method according to claim 2 wherein said toner particles comprise 10 to 90% by weight of said first resin.

5. The method according to claim 2 wherein said toner particles comprise 20 to 70% by weight of said first resin.

6. The method according to claim 2 wherein said second resin has a softening point at least 10° C. higher than said first resin.

7. The method according to claim 6 wherein said first resin has a softening temperature of 50°-100° C. and said second resin has a softening temperature of from 80°-180° C.

8. The method according to claim 7 wherein said first resin has a softening temperature of 50° to 85° C. and said second resin has a softening temperature of from 90°-140° C.

9. The method according to claim 3 wherein the kneading step (a) is performed at a temperature above the softening point of said first resin.

10. The method according to claim 3 wherein said second resultant material is substantially solid before said crushing of step (c) is performed.

11. The method according to claim 2 wherein said first resin is more susceptible to splitting than said second resin under the conditions of step (c) because it is softer.

12. The method according to claim 2 wherein said first resin is more susceptible to splitting than said second resin under the conditions of step (c) because it is more brittle.

13. The method according to claim 6 wherein:

said first resin comprising at least one thermoplastic or thermosetting resin, said thermoplastic comprising hydrogenated resin, fatty acid amide, styrene resin, polyvinyl chloride resin, polyvinyl acetate resin, polyethylene resin, polypropylene resin, acrylic resin or polyvinyl alcohol resin and said thermosetting resin comprising epoxy resin or polyester resin and said second resin comprising at least one thermoplastic or thermosetting resin, said thermoplastic resin comprising styrene resin, saturated aliphatic hydrocarbon resin or acrylic resin and said thermosetting resin comprising epoxy resin or polyester resin.

14. The method according to claim 2 wherein said first resin is thermally polymerizable.

15. The method according to claim 2 which comprises in step (a) kneading 30 parts by weight of hydrogenated resin having a softening point of 70° C., as said first resin, with 100 parts by weight of magnetite having an average particle diameter of 0.6 $\mu$m, as said magnetizable material, for 30 minutes at 120° C. to form said first resultant material, in step (b), kneading 80 parts by weight of a styrene-acrylic ester having a softening point of 94° C., as said second resin, with said first resultant material to form said second resultant material, then cooling said second resultant material to room temperature and in step (c) crushing said second resultant material to toner particles having an average particle diameter of 16 $\mu$m with said particles of magnetizable material being partially exposed from the outer boundaries of said toner particles.

16. A method for manufacturing magnetically attractive toner particles utilized for developing electrostatic latent images, having minute particles of magnetizable material exposed from the outer boundaries of said toner particles, which comprises the following steps in order:

(a) laminating minute particles of magnetizable material by a first resin material, to provide a first resultant material;

(b) kneading said first resultant material with a second resin material which is less easily split under the conditions of step (c) than said first resin material to provide a second resultant material with masses of said first resultant material being dispersed in a matrix of said second resin; and (c) crushing said second resultant material by physical impact whereby said second resultant material is substantially split along borders defined by said masses of said first resultant material to form said magnetically attractive toner particles, with said masses of said first resultant material being partially exposed on and defining the surface of said toner particles, and said magnetically attractive particles being partially exposed on the surface of said masses of said first resultant material.

17. The product of the process of claim 2.

18. The product of the process of claim 16.

19. The product of the process of claim 15.

* * * * *